(12) United States Patent
Wurster et al.

(10) Patent No.: US 10,521,599 B2
(45) Date of Patent: Dec. 31, 2019

(54) LABEL TRANSITION FOR MANDATORY ACCESS CONTROLS

(71) Applicants: BlackBerry Limited, Waterloo (CA); 2236008 Ontario Inc., Waterloo (CA)

(72) Inventors: Glenn Daniel Wurster, Kitchener (CA); Roger Francis Maclean, Ottawa (CA); Eric Serge Naud, Ottawa (CA); Tristan Michael Roach, Ottawa (CA)

(73) Assignees: 2236008 Ontario Inc., Waterloo, Ontario (CA); Blackberry Limited, Waterloo, Ontario (CA)

( * ) Notice: Subject to any disclaimer, the term of this patent is extended or adjusted under 35 U.S.C. 154(b) by 224 days.

(21) Appl. No.: 15/454,848

(22) Filed: Mar. 9, 2017

(65) Prior Publication Data
US 2018/0247062 A1    Aug. 30, 2018

Related U.S. Application Data

(63) Continuation-in-part of application No. 15/445,657, filed on Feb. 28, 2017.

(51) Int. Cl.
*G06F 21/00* (2013.01)
*H04L 29/06* (2006.01)
(Continued)

(52) U.S. Cl.
CPC .............. *G06F 21/62* (2013.01); *G06F 9/542* (2013.01); *G06F 9/546* (2013.01); *G06F 21/45* (2013.01); *G06F 2221/2113* (2013.01)

(58) Field of Classification Search
CPC .......... G06F 21/62; G06F 21/45; G06F 9/546; G06F 9/542; G06F 2221/2113
See application file for complete search history.

(56) References Cited

U.S. PATENT DOCUMENTS 5,317,746 A    5/1994  Watanabe
5,590,266 A *  12/1996 Carson .................. G06F 21/556
                                                    715/741
(Continued)

FOREIGN PATENT DOCUMENTS

EP    2 159 729 A1    3/2010
EP    2159729 A1      3/2010
(Continued)

OTHER PUBLICATIONS

Schaufler, Casey, "The Simplified Mandatory Access Control Kernel," downloaded Sep. 23, 2016, pp. 1-11, available at http://schaufler-ca.com/yahoo_site_admin/assets/docs/SmackWhitePaper.257153003.pdf.

(Continued)

*Primary Examiner* — Lisa C Lewis
(74) *Attorney, Agent, or Firm* — Rowand LLP

(57) ABSTRACT

Systems and methods for enforcing label-based mandatory access control are provided. A first label may be assigned to a resource. An event associated with a resource may be detected. The resource may be relabeled, in response to detection of the event, from a first label to a second label in accordance with a transition rule. The transition rule may be included in a security policy. The transition rule may indicate that the resource is to be relabeled to the second label if the event is detected. Access to the resource may be controlled according to an access rule in the security policy. The access rule may be applicable to the resource based on the access rule identifying the second label assigned to the resource.

16 Claims, 10 Drawing Sheets

(51) Int. Cl.
*G06F 21/62* (2013.01)
*G06F 9/54* (2006.01)
*G06F 21/45* (2013.01)

(56) References Cited

U.S. PATENT DOCUMENTS

| | | | | |
|---|---|---|---|---|
| 5,621,731 | A * | 4/1997 | Dale | .................. H04M 3/42314 370/257 |
| 6,604,123 | B1 * | 8/2003 | Bruno | .................... G06F 9/4843 709/203 |
| 6,981,140 | B1 * | 12/2005 | Choo | ..................... G06F 21/606 713/164 |
| 7,415,484 | B1 * | 8/2008 | Tulkoff | ...................... G06F 8/24 |
| 7,962,950 | B2 | 6/2011 | Choo et al. | |
| 9,146,787 | B2 | 9/2015 | Zhu et al. | |
| 2003/0208493 | A1 * | 11/2003 | Hall | ....................... G06F 16/289 |
| 2004/0123145 | A1 * | 6/2004 | Baffes | ................. H04L 63/1416 726/1 |
| 2004/0205769 | A1 | 10/2004 | Ruutu | |
| 2005/0198034 | A1 * | 9/2005 | Boyer | ................ G05B 19/4183 |
| 2005/0228916 | A1 * | 10/2005 | Telesco | ................... G06F 9/542 710/200 |
| 2008/0071708 | A1 * | 3/2008 | Dara | ..................... G06K 9/6218 706/20 |
| 2008/0184329 | A1 * | 7/2008 | Cross | .................. G06F 21/6218 726/1 |
| 2008/0235628 | A1 * | 9/2008 | Faught | ................ G06F 3/04815 715/848 |
| 2010/0042722 | A1 * | 2/2010 | Klissner | .............. G06F 9/45537 709/226 |
| 2010/0088739 | A1 * | 4/2010 | Hall | ..................... G06F 12/1483 726/1 |
| 2010/0121927 | A1 | 5/2010 | Zhang et al. | |
| 2010/0132012 | A1 | 5/2010 | Van Riel et al. | |
| 2011/0126281 | A1 * | 5/2011 | Ben-Zvi | ............. G06F 21/6218 726/21 |
| 2012/0137375 | A1 * | 5/2012 | Ramachandran | ... G06F 21/6218 726/28 |
| 2013/0247185 | A1 * | 9/2013 | Viscuso | ................ G06F 21/554 726/22 |
| 2014/0013395 | A1 | 1/2014 | Yerxa et al. | |
| 2014/0059206 | A1 | 2/2014 | Venkateshwaran | |
| 2015/0304357 | A1 * | 10/2015 | Paris | ....................... G06F 21/00 726/1 |
| 2017/0244628 | A1 * | 8/2017 | Chen | ..................... H04L 45/122 |
| 2017/0257228 | A1 * | 9/2017 | Chen | ....................... H04L 45/04 |
| 2018/0004690 | A1 * | 1/2018 | Kaminski | ............... G06F 13/18 |
| 2018/0239921 | A1 * | 8/2018 | Goyal | ................. G06F 21/6227 |

FOREIGN PATENT DOCUMENTS

| | | | |
|---|---|---|---|
| WO | 20110062743 | A2 | 5/2011 |
| WO | WO 2011/062743 | * | 5/2011 |
| WO | WO 2011/062743 | A2 | 5/2011 |

OTHER PUBLICATIONS

"TypeRules," downloaded Mar. 9, 2017, pp. 1-6, SELinuxProject, available at http://selinuxproject.org/page/TypeRules#type_change_Rule.

"Relabeling a File or Directory," downloaded Mar. 9, 2017, pp. 1-3, CENTOS, available at https://www.centos.org/docs/5/html/5.2/Deployment_Guide/sec-sel-file-relabel.html.

Branstad, M., Tajalli, H., Mayer, F., Dalva, D., "Access Mediation in a Message Passing Kernel," May 1, 1989, pp. 66-72, Proceedings, 1989 IEEE Symposium on Security and Privacy, May 1-3, 1989, Oakland, CA, ISBN: 0-8186-1939-2, retrieved from the Internet at URL: Http//ieeexplore.ieee.org/stamp/stamp.jsp?tp=&arnumber=36278.

EPO, Communication pursuant to Article 94(3) EPC relating application No. 17179875.4 dated Dec. 19, 2018.

Extended European Search Report, dated Jan. 25, 2018, pp. 1-8, issued in European Patent Application No. 17198481.8, European Patent Office, Munich, Germany.

USPTO, Office Action relating to U.S. Appl. No. 15/445,657 dated Feb. 8, 2019.

USPTO, Office Action relating to U.S. Appl. No. 15/445,657 dated Jun. 7, 2019.

EPO, EP Office Action relating to EP application No. 17198481.8, dated Jul. 5, 2019.

EPO, Communication Pursuant to Article 94(3) EPC relating to EP application No. 17179875.4 dated Sep. 19, 2019.

* cited by examiner

402

```
[version=1]
/allowed/path
!/forbidden/path
0:13488:*      # grant access to all channels for
pid=13488
!2:*:*         # no access to node 2
0:8196:1       # grant access to chan.1 for pid.8196
*
```

!2:*:*

404 → 2
406 → *
408 → *
304 → !
302 (covers 2:*:*)
306 (covers !2:*:*)

FIG. 4

LABEL TRANSITION FOR MANDATORY ACCESS CONTROLS

This application is a continuation-in-part application of, and claims priority under 35 USC § 120 to non-provisional application Ser. No. 15/445,657, entitled "CHANNEL-BASED MANDATORY ACCESS CONTROLS", filed Feb. 28, 2017, the entire contents of which are incorporated by reference.

TECHNICAL FIELD

This disclosure relates to mandatory access control and, in particular, to label-based mandatory access control.

BACKGROUND

In message-based operating systems, the calling or invocation of programmatic procedures of the operating system involves a messaging system. The invocations of programmatic procedures of the operating system result in corresponding messages being passed through the messaging system from a sender process to a receiver channel, and ultimately to a receiver process.

In some systems, access control governs the ability of a subject to perform operations on objects. Mandatory access control governs access to the objects independent of ownership of the objects. In contrast, discretionary access control controls govern access to the objects based on the subject's ownership of the object.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 4 illustrates an example of a channel configuration that includes configuration content.

DETAILED DESCRIPTION

Message-based operating systems are exposed to numerous security vulnerabilities arising from the communication of messages between system resources over communication channels. For example, messages may be inadvertently or maliciously communicated to system resources over unprotected communication channels, potentially causing a security breach on message-based operating systems. Present approaches to mandatory access control fail to adequately address security enforcement in message-based operating systems.

Methods and systems for enforcing mandatory access control in a message-based operating system are provided that may address one or more computer security vulnerabilities. By way of an introductory example, calls to operating system logic may be passed as messages over communication channels in a message-based operating system. A first process configured to receive a message via a communication channel in a message-based operating system may be identified. In addition, the communication channel may be identified. Further, an access rule may be identified. The access rule may be a rule to govern access to the communication channel. The access to the communication channel by the second process may be controlled based on the access rule. The access may be controlled in a kernel of a message-based operating system. The second process may be configured to execute invocation logic. The invocation logic may be executable to send the message to the communication channel.

One interesting feature of the systems and methods described below may be that communication channels of a message-based operating system may be subject to mandatory access control. Alternatively or in addition, processes configured to receive messages from any of the communication channels may be protected by controlling the access to the communication channels.

Figure 1:
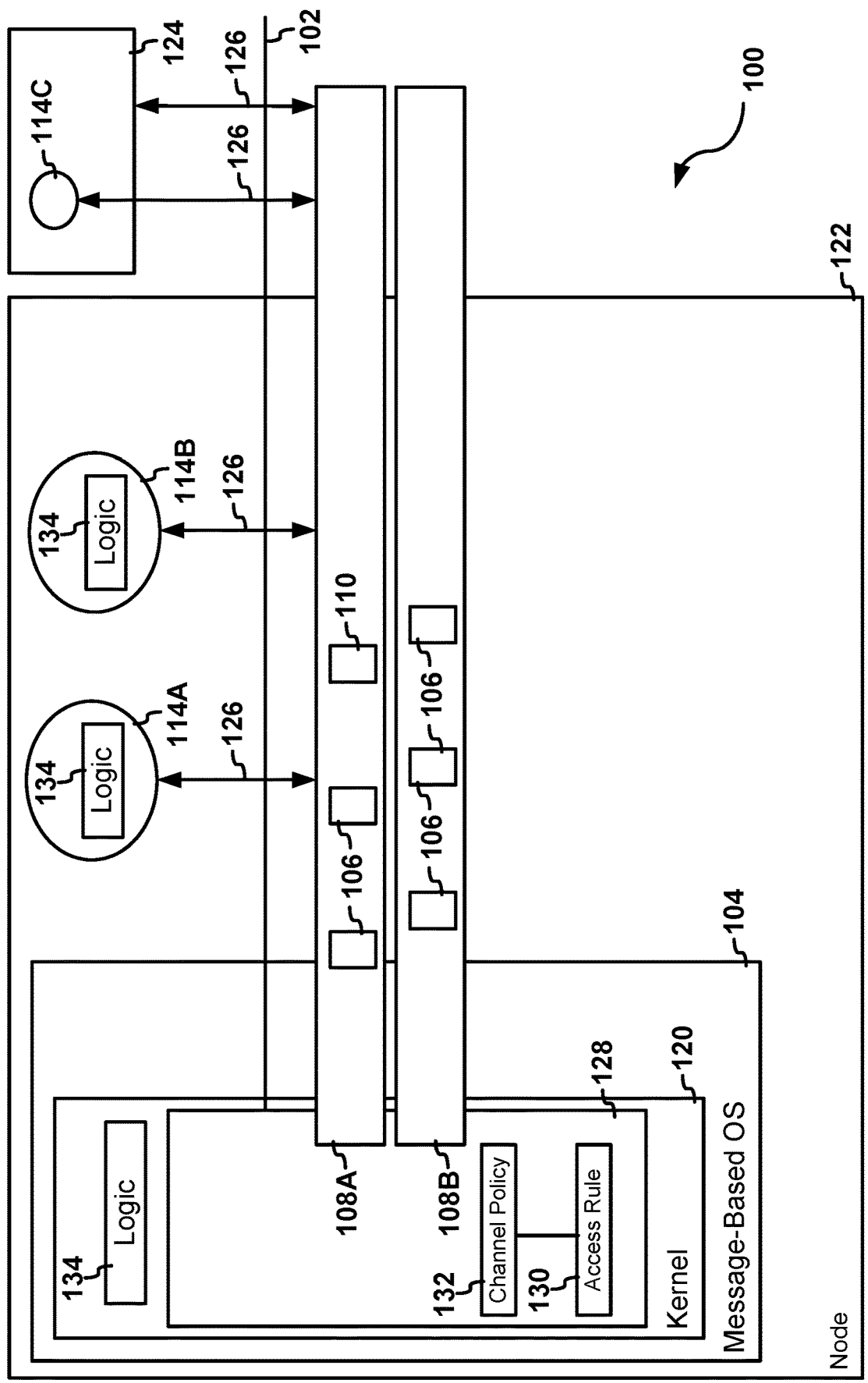
FIG. 1 illustrates an example of a system to enforce mandatory access control in a message-based operating system.

FIG. 1 illustrates an example of a system 100 to enforce mandatory access control 102 in a message-based operating system 104. The message-based operating system 104 may be any operating system where all or at least a majority of calls to operating system logic (in other words, invocations of programmatic procedures included in the operating system's application programming interface) are passed as messages over communication channels 108. For example, in FIG. 1, the messages 106 are communicated over the communication channel 108A between system objects, such as processes 114. The term "processes" as used herein may mean threads as well as processes In the example illustrated in FIG. 1, the processes 114 may communicate with each other over the communication channels 108. For example a first process 114A configured to communicate on the communication channel 108A may receive messages from a second process 114B configured to communicate messages on the communication channel 108A. Additionally or alternatively, a first node 122 may communicate with a second node 124 over the communication channels 108. For example, a third process 114C on the second node 122 may communicate a message 110 to the first process 114A on the first node 112. Additional arrangements of processes, nodes and communication channels may be implemented in other examples.

In message-based operating systems, it may be desirable to control access to functionality provided by processes. The mandatory access control 102 may be a security feature of the message-based operating system 104. In the example illustrated in FIG. 1, the mandatory access control 102 may control access 126 to the communication channel 108A. For example, the mandatory access control may control the access 126 of the first process 114A to the communication channel 108A. Additionally or alternatively, the mandatory access control many control the access 126 of a second process 114B to the communication channel 108A. In an additional example, the mandatory access control may control the access of the process 114C on the second node 124 to the communication channel 108A.

To enforce the mandatory access control 102, the system 100 may include a channel manager 128. The channel manager 128 may identify the first process 114A and the communication channel 108A. In addition, the channel manager 128 may identify an access rule 130 based on a channel policy 132. The access rule 130 may govern the access 126 to the communication channel 108a. The channel manager 128 may control the access 126 to the communication channel 108A based on the access rule 130. For example, the channel manager may control the access 126 to the communication channel 108(a) by the second process 114A. The second process 114A may be configured to send the message 110 to the communication channel 108A.

Alternatively or in addition, the channel manager 128 may control communication over the communication channel 108A between the nodes 122, 124. For example the first node 122 may communicate messages over the communication channel 108A. As another example, the second node 124 may communicate messages over the communication channel 108A. The channel manager 128 may control the access to the communication channel 108A by the first node 122. In addition, the channel manager 128 may control the access to the communication channel 108A by the second node 124. In other examples, the channel manager 128 may control the access 126 to the communication channel 108A of the third process 114C on the second node 124.

In a broad sense, the channel manager 128 may control the access 126 to the communication channels 108A by any system object. A system object may be any object configured to communicate with messages in the system 100. For example a system object may include the first process 114A, the second process 114B and the third process 114C. Additional examples of system objects include the kernel 120 and the nodes 122, 124. In addition, the communication channels 108 may be a system object. For example, a communication channel may communicate messages to another communication channel.

In some examples, the system 100 may include an open communication channel 108B. The channel manager 128 may determine that the open communication channel 108B is not subject to the mandatory access control 102. Accordingly, the access 126 to the open communication channel 108B may be authorized by default.

The messages 106 may be information exchanged on the message-based operating system 104. The messages 106 may represent calls to logic 134 that implements requested functionality. For example, invoking an operating system API, such as mmap( ), may result in a message being sent to a process that implements mmap( ). The messages 106 may include, for example, parameters used by the logic 134 perform operations. Additionally or alternatively, the logic 134 may create the messages 106. For example, the logic 134 of the second process 114B may create the message 110 that is configured to invoke the logic 134 of the first process 114A.

The messages 106 may follow a messaging format native to the message-based system 104. The messaging format may be conducive for communicating the messages 106 over the communication channels 108. For example, the messages 106 may include routing information used by the message-based operating system 104 to route the messages 106 between system objects. For example, the messages 106 may include process identifiers for the sending process and the receiving process. The routing information may include information related to a source process and a destination process. For example, the messages 106 may include a node identifier that identifies a node, such as the first node 104 or the second node 124 on which the source process and the destination process executes. Additionally or alternatively, the messages 106 may identify a communication channel the messages 106 are intended for. The messages 106 may include other information pertaining to the message-based operating system.

The communication channels 108 may be any virtual or physical communication path over which the messages 106 may travel in the message-based operating system 104. The communication channels 108 may include a resource or a group of resources for exchanging the messages 106 between system objects. For example, the communication channels 108 may include an implementation of inter-process communication. In some examples, the communication channels 108 may be implemented with files, signals, sockets, pipes, named pipes, semaphores, shared-memory, message queues, any other technique, or combinations of techniques, of message communication. Moreover, the implementation of each of the communication channels 108 may vary within the message-based operating system 102. For example the communication channel 108A may be implemented with sockets while the open communication channel 108B may be implemented with message queues and shared-memory. Any other suitable implementation, combination of implementations, or technique may be used to implement the communication channels 108.

The messages 106 may be routed on the communication channels 108. For example, the message-based operating system 104 may route the messages 106 on the communication channels 108. In some examples, the kernel 120 of the message-based operating system may route the messages 106 on the communication channels 108. Alternatively, the messages 106 may be routed by at least one of the processes 114.

The processes 114 may be instances of a computer program being executed. In some examples, the process may be made up of multiple threads of execution that execute instructions concurrently. The instructions may implement the logic 128 of the computer program. The processes 114 may execute on multiple nodes. For instance, the processes 114 may execute on the first node 122 and the second node 124. Moreover, the processes 114 may execute inside of the message-based operating system 104. Additionally or alternatively, the processes 114 may be executing outside of the message-based operating system 104 (as illustrated in FIG. 1).

The nodes 122, 124 may comprise any physical or virtual host. For example, the first node 122 may comprise a physical hardware device such as a computer, mobile phone, tablet, wearable device, vehicle, or other type of hardware. In some examples, the first node 122 may include or be included in a vehicle, such as a motor vehicle, an aircraft, a spacecraft, a watercraft, a railed vehicle, or any other type of vehicle. Alternatively, the first node 122 may comprise a virtual host, such as a virtual machine or a container, operating within the physical host. In some examples, the first node 122 and the second node 124 may be connected by a communications network (not shown). The communication channel 108A may be configured to communicate over the network.

The kernel 120 may be a core of the message-based operating system 104. The kernel 120 may implement operating system functionality. For example, the kernel 120 may implement operating system tasks such as, for example, certain aspects of inter-process communication, memory management, file system management, device driver management, or any other type of operating system functionality. The kernel 120 may implement all or a portion of the channel manager 128. For example, the channel manager 128 may control the access 126 to the communication channels 108 by system objects in the kernel 120 of the message-based operating system 104.

The kernel 120 may also include the logic 134 that implements requested functionality. Accordingly, the kernel 120 may be responsive to messages 106 communicated over the communication channels 108. Additionally, the kernel 120 may invoke logic outside of the kernel 120 with the messages 106 communicated on the communication channel 108A. For example, the kernel 120 may invoke the logic 134 of the second process 114A by communicating the message 110 over the communication channel 108A to the second process 114A. In addition, the logic 134 in the kernel 120 may be invoked by communicating the message 110 over the communication channel 108A.

The channel policy 132 may be a security policy indicative of how to enforce the mandatory access control 102. For example, the channel policy 132 may specify how to control the access 126 to the communication channels 108 by the system objects. The access rule 130 may be identified based on the channel policy 132. The channel policy 132 may include, or be associated with, the access rule 130. The access rule 130 may be indicative of a privilege to communicate over the communication channel 108A. For an example of the channel policy 132 and the access rule 130, see FIG. 3, which is described in detail below.

The access 126 to the communication channel 108A may be the ability to interact with the communication channel 108A. For example, the access 126 may be the ability to communicate the message 110 over the communication channel 108A. In a more specific example, the access 126 may be the ability to send the message 110 over the communication channel 108A. Additionally or alternatively, the access 126 may be the ability to receive the message 110 over the communication channel 108A. Additionally or alternatively, the access 126 may be the ability to create, read, write, or delete the message 110 on the communication channel 108A. Other examples of the access 126 may be the ability to connect to the communication channel 108A, the ability to establish a connection with the communication channel 108A, and the ability to engage the communication channel 108A in any manner of communication.

The logic 134 may be any form of logic implemented as computer executable instructions. The logic 134 may be responsive to the messages 106. For example, the logic 134 in the first process 114A may be responsive to the message 110 received from the communication channel 108A. Additionally or alternatively, the logic 134 may invoke other logic by sending the messages 106 over the communication channels 108. For example, the logic 134 of the second process 114A may invoke the logic 134 of the first process 114A by communicating the message 110 over the communication channel 108A.

In monolithic operating systems, operating system functionality traditionally is implemented in a kernel or in a privileged kernel space. In the message-based operating system 104, as described herein, operating system functionality may be implemented in processes that receive the messages 106 sent from calling processes. In some examples, the processes that implement the operating system functionality may execute in a user space instead of or in addition to the privileged kernel space. Because the user space represents an un-privileged memory space, it may be desirable to secure the operating system functionality. Operating system functionality may be secured with the system 100 to enforce the mandatory access control 102.

Figure 2:
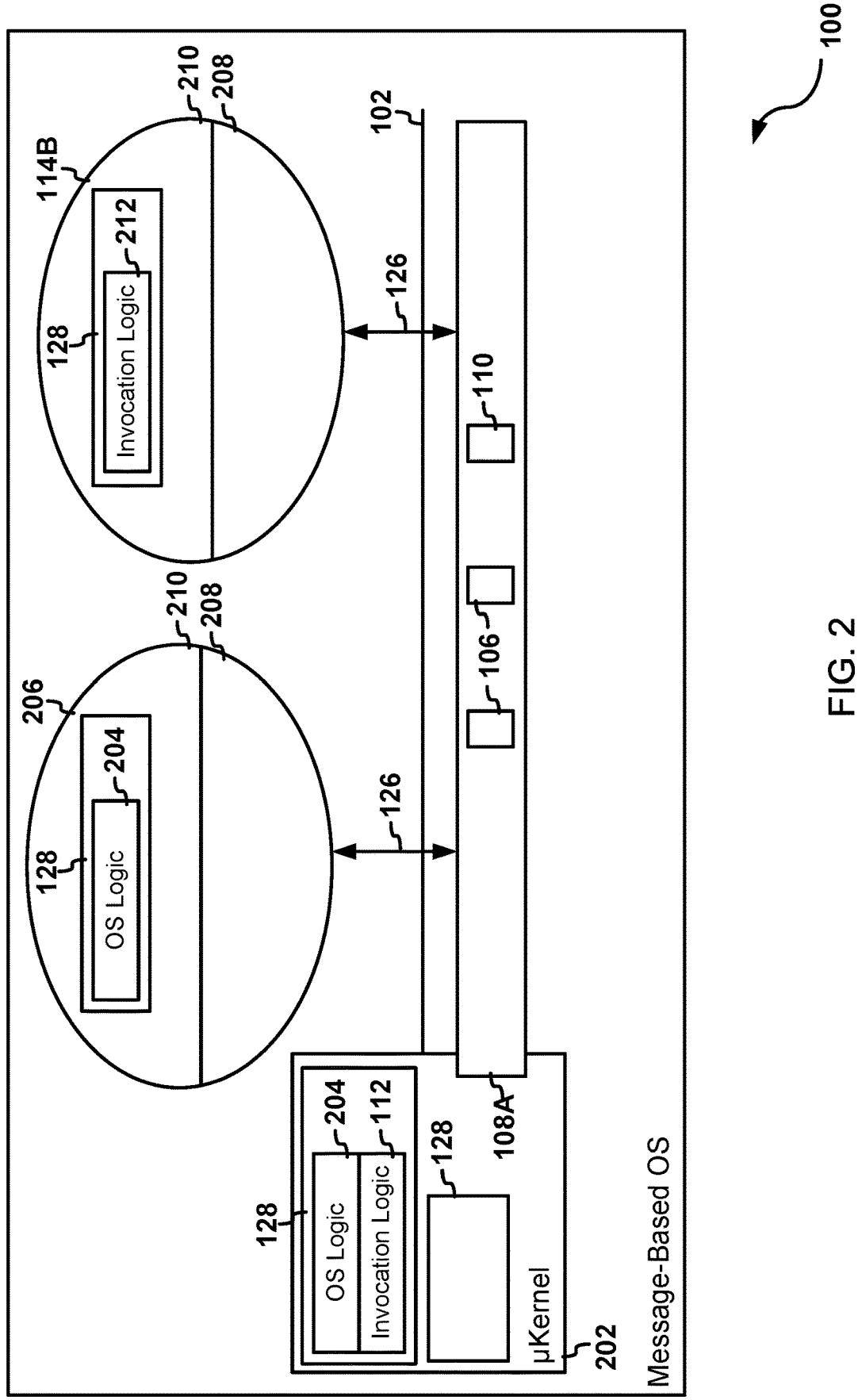
FIG. 2 illustrates an example of a system including a micro-kernel and an operating system process.

FIG. 2 illustrates an example of the system 100 including a micro-kernel 202 and an operating system process 206.

In some examples, the system 100 may include the micro-kernel 202. Operating system logic 204 may be divided between the micro-kernel 202 and the operating system process 206. In addition, the operating system logic 204 may be implemented in a kernel space 208 of an operating system process 202. Additionally or alternatively, the operating system logic 204 may be implemented in a user space 210 of the operating system process 202 (as illustrated in FIG. 2.) The operating system logic 204 may be responsive to messages 106 communicated over the communication channel 108A.

The mandatory access control 102 may be enforced by the system 100 to protect the operating system process 206 and the operating system logic 204. For example, the channel manager 128 may identify the operating system process 206 and the communication channel 108A. In addition, the channel manager 128 may identify the access rule 130 based on a channel policy 132. The access rule 130 may be indicative of a rule to communicate the message 110 to the operating system process 206 over the communication channel 108A. The channel manager 128 may control the access 126 to the communication channel 108A by the second process 114A based on the access rule 130. The second process 114A may be configured to invoke the operating system logic 204.

The operating system logic 204 may be a special form of logic 128 dedicated to operating system functionality. The operating system logic 204 may be responsive to the messages 106 to provide operating system functionality outside of the micro-kernel 202. For example the operating system logic 204 may implement certain aspects of inter-process communication, memory management, file system management, device driver management, or any other types of operating system tasks. Calls to the operating system logic 204 may be invoked with the messages 106.

The operating system process 206 may be a process that implements the operating system logic 204. The operating system process 206 may be responsive to a messages 106 communicated over the communication channel 108A. For example, the operating system process 206 may be responsive to a message communicated from a kernel 120 or a micro-kernel 202.

The kernel space 208 may be a privileged memory space. The kernel space may be reserved for running privileged logic in the message-based operating system. The user space 210 may a non-privileged memory space. The user-space may be a memory space where operating system logic 204 is executed in the system 100.

The logic 128 may include invocation logic 212. The invocation logic 212 may invoke the logic 128 of system objects by communicating messages 106 over the communication channels 108. For example, the invocation logic 212 of the second process 114A may communicate the message 110 over the communication channel 108A to invoke the operating system logic 204 executable in the operating system process 206.

Figure 3:
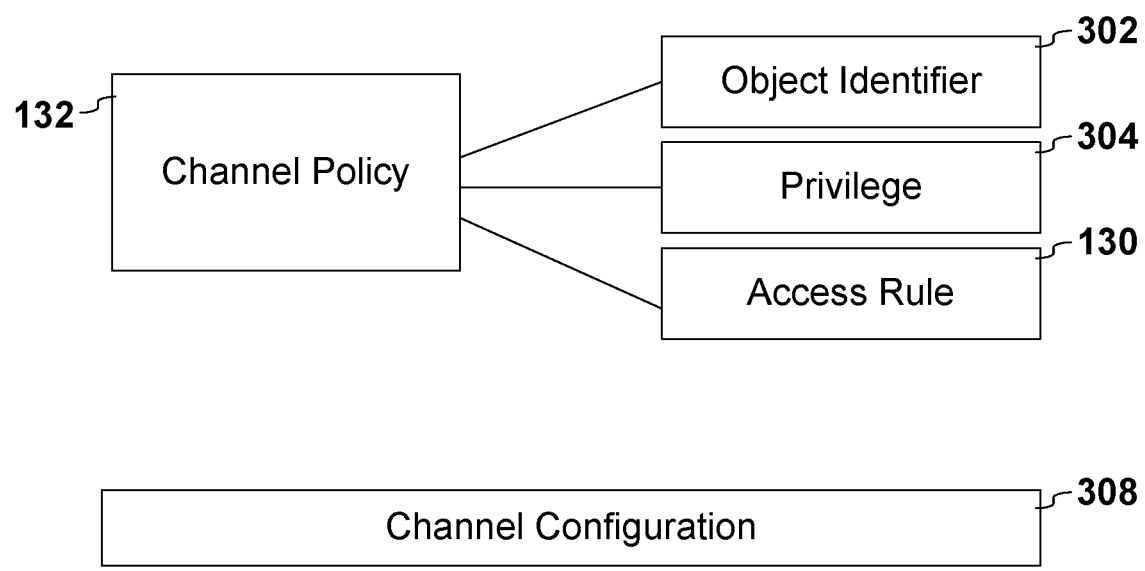
FIG. 3 illustrates an example of a channel policy and an access rule.

FIG. 3 illustrates an example of the channel policy 132 and the access rule 130. The channel policy 132 may be a security policy indicative of how to enforce the mandatory access control 102 in the system 100. For example, the channel policy 132 may specify how to control the access 126 to the communication channels 108 by the system objects.

In the example illustrated in FIG. 3, the channel policy 132 may be associated with, or include, an object identifier 302, a privilege 304, and an access rule 130. The object identifier 302 may be an identifier of a system object. For example, the object identifier 302 may be an identifier of any of the processes 114, any of the nodes 122, 124, any of the communication channels 108, or any combination thereof. Examples the object identifier 302 include a process id, a channel id, a node id, a memory address, a descriptive label, or any other information used to identify a system object.

The privilege 304 may be an indicative of an action taken in regard to controlling the access 126. For example the privilege 304 may be an allowance. Alternatively, the privilege 304 may be a denial.

The access rule 130 may govern how to control the access 126 to the communication channel 108A. For example, the access rule 130 may designate how to control the access 126 to the communication channels 108 by the system objects configured. For example, the access rule 130 may indicate to the channel manager to control the access to the communication channel 108A by the second process 114B.

In addition, the access rule 130 may designate how to control the access 126 to the communication channels 108 by the system objects configured to send messages 106 to the communication channels 108. In some examples, the access rule 130 may be an allowance of the access 126 to the communication channel 108A. Alternatively, the access rule 130 may be a refusal of the access 126 to the communication channel 108A.

In some examples the access rule 130 may comprise a connection rule. The connection rule may specify how to control a connection to the communication channel 108A. For example, the connection rule may be an allowance of a connection to the communication channel 108A. Alternatively, the connection rule may be a denial of a connection to the communication channel 108A.

Various combinations of the object identifier 302 and the privilege 304 may form the access rule 130. The access rule may include at least one of the privilege 304 or the object identifier 302. For example, the access rule may include at least one object identifier 302. Additionally or alternatively, the access rule may include at least one privilege 304.

The channel policy 132 may be created based on a channel configuration 308. The channel configuration 308 may be a configuration that includes at least one of the channel policy 132, the object identifier 302, the privilege 304, or the access rule 130. The channel configuration 308 may be read by the channel manager 128 to establish the channel policy 132.

Various combinations of privileges, object identifiers, and access rules may establish the channel policy 132. Moreover, the channel policy 132 may be based on a channel configuration of various formats and syntax.

In some examples, at least one of the processes 114 may be associated with a type. The type may be a label associated with various rights, privileges, or other permissions to communicate with other processes or communication channels 108. The channel policy 132 may include the type. The type may be associated with the object identifier 302 in the configuration file 402. Alternatively or in addition, the type may be passed to at least one of the processes 114 by a command line parameter.

Access to the communication channels 108 may be controlled based on types associated with the processes 114. In some examples, the access rule 130, or other examples of privileges, may be associated with the types. For example, the first process 114a may be associated with a first type and a second process 114b may be associated with a second type. Communication between the first process 114a and the second process 114b over the communication channel 108a may be controlled based on the types associated with each process. For example, if the access rule 130 indicates that processes of the first type may connect to processes of the second type, then the first process 114a may be allowed to send messages over the communication channel 108a to the second process 114b. In other examples, types may be associated with the nodes 122, 124 or the communication channels 108. FIG. 4 illustrates an example of the channel configuration 308 that includes configuration content 402. The configuration content 402 may include the information necessary to establish the channel policy 132. The configuration content 402 may be information stored in a configuration file, a memory, a database, a large binary object, or any other type of computer storage resource. The channel content may be read by the system 100 to form the channel policy 132. For example, the configuration content 402 may be parsed by the channel manager 128.

The configuration content 402 may follow a syntax that can be read by the system 100 to establish the channel policy 132. The access rule 130 may be included in the configuration content 402. The object identifier 302 may include a node identifier 404, a process identifier 406, and a channel identifier 408. Identifiers 404, 406, 408 may identify a single object or multiple objects. In the example illustrated in FIG. 4, the node identifier 404 is "2", identifying a single node that an operating system identified as node "2", while the process identifier 406 is an asterisk identifying all of the processes 114 in the system 100. Additional combinations of privileges, node identifiers, processes identifiers, and channel identifiers may be implemented.

In the example illustrated in FIG. 4, the examples of the process identifier 406 include an asterisk indicating all processes and a process identifier, such as 13488, which an operating system assigned to a process when the process was created. In an alternative example, the node identifier 404, the process identifier 406, and the channel identifier 408 may include a label, such as a text label. For example, the label may be the word "network". The object identifier 302 may be, for example, "0:network:*" granting access to all channels of any process labeled "network". In some examples, a process may be labelled by passing the label as a parameter to the command line starting the process. For example, executing "on -I network io-pkt" in a command line of an operating system may start execution of the command "io-pkt" in a process and label the process with the label "network".

Identification of resources, such as processes, by a message based operating system may vary over time. For example, as the processes are destroyed or created, or the message-based operating system is restarted, identifiers assigned to the processes by the message-based operating system may vary. The label may provide a consistent identification of the node identifier 404, the process identifier 406, and the channel identifier 408 independent of the identification scheme of the message-based operating system. In addition, the node identifier 404, the process identifier 406, and the channel identifier 408 may include identical labels. For example, a process may create a channel and assign the channel a label that is identical to the label assigned to the process.

In some examples, the labels may be associated with a file path. The file path may include a path label. The path label may include text. For example, the path label may include text such as "/dev/socket". The file path may be included in the configuration content 402, a configuration file, or in a memory. The file path may be associated with any of the following, for example: the label of the node identifier 404, the process identifier 406, and the channel identifier 408. A process assigned to the file path may discover channels associated with the file path. Thus, for example, the process assigned to the file path "/dev/socket" may be permitted to establish communication with channels assigned to the file path "/dev/socket". In some examples, a process that creates the channel may associate the channel with the file path. The other processes may query the configuration content 402, or another source, to discover channels associated with the file path.

A rule may permit or restrict communication over the communication channels based on the file path. For example, the rule may permit a first group of processes assigned to the file path to discover or communicate over channels assigned to the file path. Alternatively or in addition, the rule may restrict a second group of processes that are not assigned to the file path from discovering or communicating over the channels assigned to the file path. The rule may include the access rule 130 or any other text that is grouped with the file path or the label of the node identifier 404, the process identifier 406, or the channel identifier 408. The rule may be included in the configuration content 402, the configuration file, or in the memory.

The rule may include additional rules that modify the labels that are associated with the file path. In some examples, the rule may provide for changing the label of any of the node identifier 404, the process identifier 406, and the channel identifier 408 based on the file path the label is bound to. For example, a process that was created with the label "network" may create a channel. The process or the message-based operating system 104 may associate the label of the channel with the path "/dev/socket". The rule may provide that if a process with the label "network" associates a channel to the path "/dev/socket" then the label of the channel is set to "network_socket". The channel policy 132 may be stored in any format. For example, the channel policy 132 may be stored in a binary format. Alternatively or in addition, the channel policy 132 may be stored in a text format comprising unparsed text like the configuration content 402 illustrated in FIG. 4. Any suitable format for describing the channel policy 132 may be used in the configuration content 402, so the format may differ from the format illustrated in FIG. 4.

Figure 5:
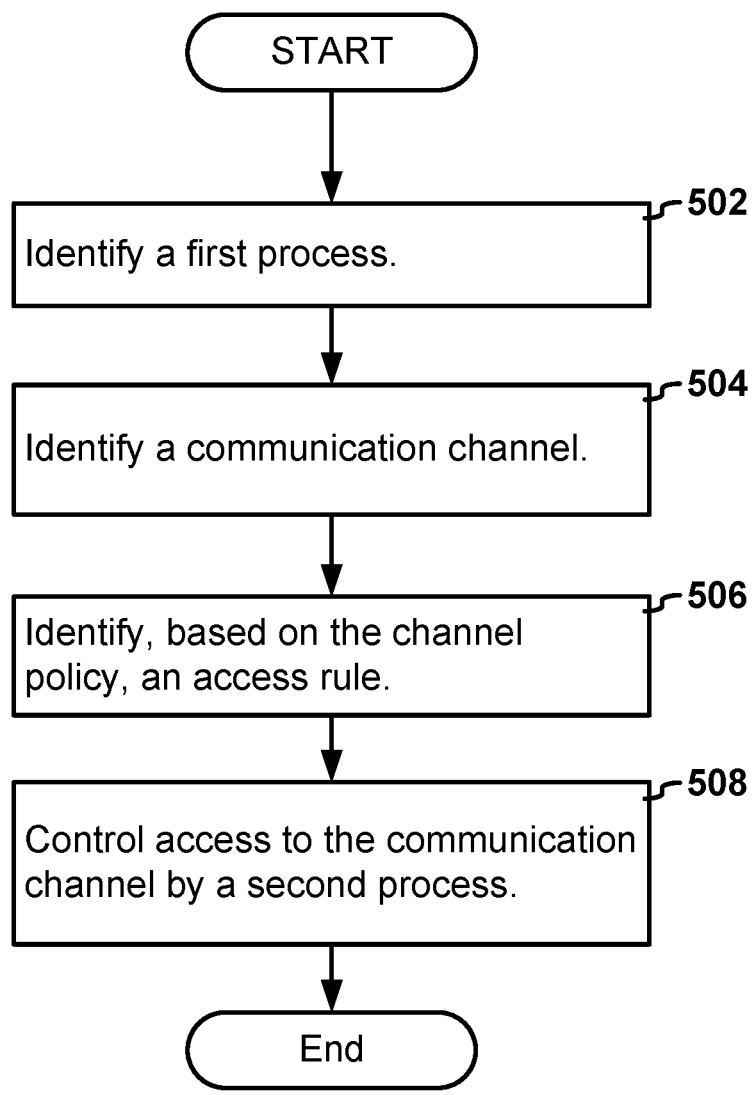
FIG. 5 illustrates a flow diagram of example logic of a system to enforce the mandatory access control in a message-based operating system.

FIG. 5 illustrates a flow diagram of example logic of the system 100 to enforce the mandatory access control 102 in the message-based operating system 104. The mandatory access control 102 starts, the first process 114A may be identified (502). The first process 114A may be configured to receive the message 110 via the communication channel 108A in the message-based operating system 104. Additionally or alternatively, the first process 114A may be an operating system process 206 configured to execute the operating system logic 204. The first process 114A may be identified based on an identifier of the first process 114A. Additionally or alternatively, the first process 114A may be identified based the object identifier 302 designated in the channel policy 132.

The communication channel 108A may be identified (504). The communication channel 108A may be identified based on a channel identifier associated with the communication channel 108A. Additionally or alternatively, the communication channel 108A may be identified by the object identifier 302 designated in the channel policy 132.

The access rule 130 may be identified based on the channel policy 132 (506). The access rule 130 may a rule to govern the access 126 the communication channel 108. For example, the access rule 130 may designate the allowance of the access 126 to the communication channel 108A by the second process 114B. Additionally or alternatively, the access rule 130 may designate a refusal of the access 126 to the communication channel 108A by the second process 114B.

The access 126 to the communication channel 108A may be controlled (508). For example, the access 126 to the communication channel 108A by the second process 114A may be controlled based on the access rule 130. In some examples, the access 126 may be controlled in the kernel 120 of the message-based operating system 104. In addition, the access 126 may be controlled in the micro-kernel 202.

The logic illustrated in FIG. 5 may be implemented in a different sequence. The logic illustrated in FIG. 5 may include additional, different, or fewer operations. For example, the logic illustrated in FIG. 5 may also include an operation to initialize first process 114A. The system may initialize the first process 114A during the launch of the message-based operating system. In some examples, the kernel 120 may initialize the first process 114A. Initializing the process may include spawning the process 114A.

In another example, the logic illustrated in FIG. 5 may also include an operation to configure the communication channel 108. The communication channel 108A may be configured to communicate the messages 106 between the processes 114. For example, the communication channel 108A may be configured to communicate the message 110 to the first process 114A.

In another example, the logic illustrated in FIG. 5 may also include an operation to read the channel configuration 308. The channel policy 132 may be generated based on a channel configuration 308. For example, the channel content 402 of the channel configuration 308 may be parsed to generate the channel policy 132.

Figure 6:
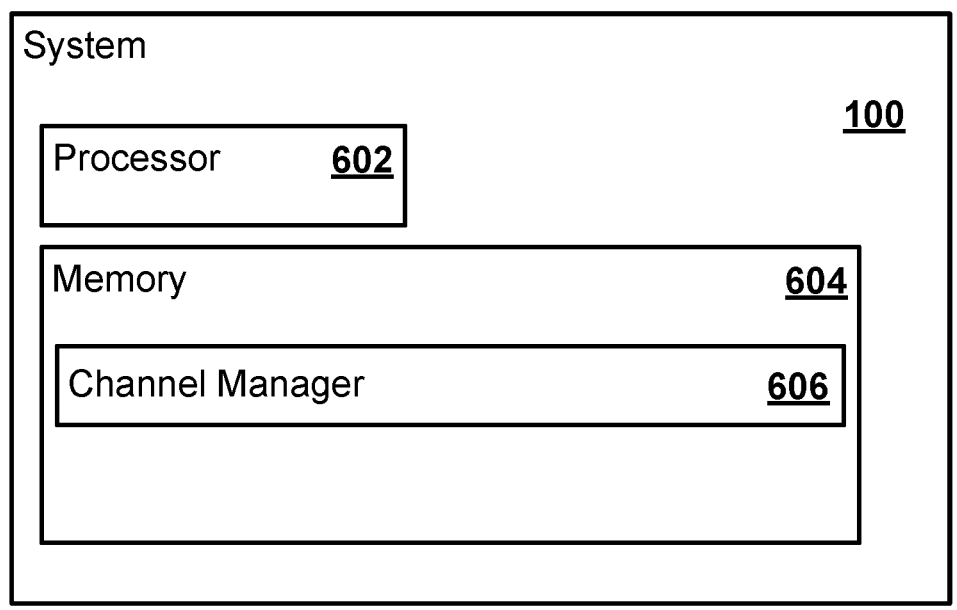
FIG. 6 illustrates an example of a system that includes a memory and a processor.

The system 100 may be implemented with additional, different, or fewer components than illustrated. For example, FIG. 6 illustrates an example of the system 100 that includes a memory 604 and a processor 602.

The processor 602 may be in communication with the memory 604. In one example, the processor 602 may also be in communication with additional elements, such as a network interface (not shown). Examples of the processor 602 may include a general processor, a central processing unit, a microcontroller, a server, an application specific integrated circuit (ASIC), a digital signal processor, a field programmable gate array (FPGA), and a digital circuit, analog circuit.

The processor 602 may be one or more devices operable to execute logic of the system 100. The logic of the system 100 may include computer executable instructions or computer code embodied in the memory 604 or in other memory that when executed by the processor 602, cause the processor 602 to perform the features implemented by the logic of the system 100. The computer code may include instructions executable with the processor 602.

The memory 604 may be any device for storing and retrieving data or any combination thereof. The memory 604 may include non-volatile and/or volatile memory, such as a random access memory (RAM), a read-only memory (ROM), an erasable programmable read-only memory (EPROM), or flash memory. Alternatively or in addition, the memory 604 may include an optical, magnetic (hard-drive) or any other form of data storage device.

The memory 604 may include at least one of a channel manager module 606, and/or any other component in the system 100 including the first node 122, the second node 124, the logic 134 the communication channel 108A, the channel policy 132, message-based operating system 104, the message 110 or the kernel 120, the user space 210, the kernel space 208, the channel configuration 308, the object identifier 302, the privilege 304, the access rule 130.

The channel manager module 606 may include any module configured with the logic of the system 100 to enforce mandatory access control. For example, the channel manager module 606 may include the channel manager 128.

Each component may include additional, different, or fewer components. For example, the logic 134 may only include operating system logic 204. As another example, the access rule 130 may only include the privilege 304.

The system 100 may be implemented in many different ways. Each module, such as the channel manager module 606, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 604, for example, that comprises instructions executable with the processor 602 or other processor to implement one or more of the features of the module. When any one of the module includes the portion of the memory that comprises instructions executable with the processor, the module may or may not include the processor. In some examples, each module may just be the portion of the memory 604 or other physical memory that comprises instructions executable with the processor 602 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

In general, mandatory access control (MAC) may be implemented in a variety of systems, including the message-based operating systems described herein and other types of operating systems. MAC may constrain the ability of a subject or initiator, such as a process, to perform an operation or an action on an object or a target to just operations or actions allowed by privileges granted by a system integrator, a system administrator, or other party. In some examples, the system integrator may write security policies that cannot be overridden by the applications that execute on a system controlled by MAC. MAC may be label-based. Resources in a label-based MAC system may be assigned labels. Rules in a security policy of the label-based MAC system may dictate what operations or actions are allowed to be performed on the resources. In some examples, it may be desirable to update a label assigned to one or more of the resources during runtime. Systems and methods may be provided that include transition rules in a security policy that establish criteria for updating labels assigned to corresponding resources based on events that take place on the system 700.

Label-based MAC systems may assign labels to resources according to various conventions and algorithms. Since resources may be created during runtime, the proper labels assigned to the resources may be unknown when securities policies for the MAC system are created or implemented. Relabeling resources, as described herein, may decrease security vulnerabilities while increasing the flexibility of deploying and enforcing MAC. Alternatively or in addition, one interesting feature of the systems and methods described below may be that resources may be relabeled based on operating conditions identified in the security policies of the label-based MAC systems. In addition, another interesting feature of the system and methods described below may be that access to the resources may be controlled based on updated labels assigned to the resource.

Figure 7:
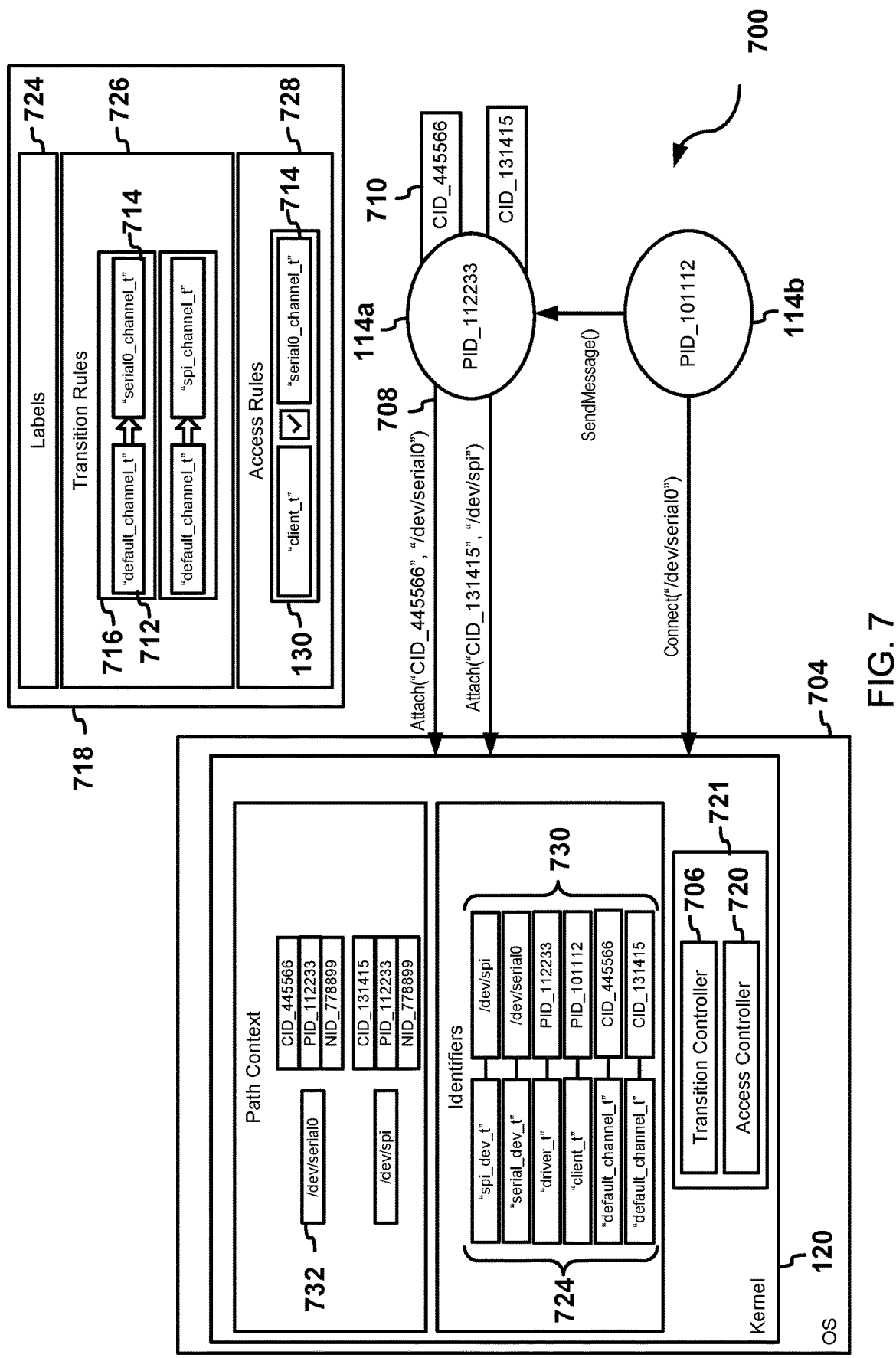
FIG. 7 illustrates an example of a system to enforce label-based mandatory access control.

FIG. 7 illustrates an example of a system 700 to enforce label-based mandatory access control. The system 700 may include a transition controller 706 to detect an event 708 associated with a resource 710. The resource 710 may be labeled with a first label 712. The transition controller 706 may relabel, in response to detection of the event 708, the resource 710 with a second label 714 in accordance with a transition rule 716. A security policy 718 may include the transition rule 716. The transition rule 716 may indicate that the resource 710 is to be relabeled to the second label 714 if the event 708 is detected. The system 700 may further include an access controller 720 to control access to the resource 710 according to an access rule 130 in the security policy 718. The access rule 130 may be applicable to the resource 710 based on the access rule 130 identifying the second label 714 assigned to the resource 710.

The system 700 may implement the label-based mandatory access control according to the security policy 718. The system 700 may include a policy enforcement point 721. The policy enforcement point 721 may include the access controller 720 and the transition controller 706. The policy enforcement point 721 may apply the security policy 718 to enforce the label-based mandatory access control.

The security policy 718 may include labels 724, transition rules 726 and access rules 728. The access controller 720 and the transition controller 706 may enforce the security policy 718. For example, the labels 724 may be associated with resources. In some examples, the labels 724 may be mapped to resource identifiers 730 of the resources. The transition rules 726 and access rules 728 may refer to the labels 724. The access controller 720 may apply the access rules 728 and the transition controller 706 may apply the transition rules 726 to enforce the security policy 718.

The transition controller 706 may update the labels 724 according to the transition rules 726. For example, the labels 724 may include the first label 712 and the second label 714. The transition controller 706 may transition the first label 712 to the second label 714. In addition, the access controller 720 may control access to the resources associated with the resource identifiers 730 based on the access rules 728. Accordingly, the transition controller 706 may update the labels 724 mapped with the resource identifiers 730. In addition, the access controller 720 may control access to the resources associated with the resource identifiers 730.

The labels 724, transition rules 726 and access rules 728 may be specified in a textual policy (not shown in FIG. 7). A compiler may compile the textual policy and generate the security policy 718. Thus, a system administrator may create the textual policy which specifies the mandatory access control for the system 700 and the system 700 may implement the mandatory access control based on the security policy 718. The labels 724, transition rules 726, access rules 728, and any other information in the security policy may be specified in a first format in the textual policy and compiled into a second format in the security policy 718. In alternative examples, no compiler is used and the security policy 718 may be directly configured.

In some examples, the transition controller 706 may transition the first label 712 to the second label 714 in accordance with the transition rule 716. The transition rule 716 may indicate transitioning the first label 712 to the second label 714 in response to the event 708. Accordingly, the transition controller 706 may relabel the resource 710 with the second label in response to the event 708.

As illustrated in FIG. 7, the event may include the resource 710 attaching to a path 732. For example, the transition rule 716 may be specified in the textual policy as follows:

relabel_on_attach driver_t default_channel_t:channel serial_dev_t:path serial0_channel_t The format of the transition rule 716 in the above example is relabel_on_<event><label of subject causing the event><label of resource>:<resource type><label of associated resource>:<type of associated resource><new label>. The transition rule 716 may be specified in any other suitable format. The transition controller 706 may detect the event 708. The event may include the first process 114a (labeled driver_t) calling an attach programmatic procedure to attach the resource 710 (labeled default_channel) to the path 732 (labeled serial_dev_t). In response to the event 708, the transition controller 706 may update the first label 712 (default_channel_t) to the second label 714 (serial_channel_t). Thus, the transition controller 706 may update the labels 724 so that the second label 714 (serial_channel_t) may be associated with a resource identifier (CID_45566) of the resource 710. In other examples, the second label 714 may be associated with the resource 710 directly, a memory location of the resource 710, or any other identifier or structure specifying the resource 710.

As additionally illustrated in FIG. 7, the access controller 720 may control access to the resource 710 based on one or more of the labels 724. For example, the access controller 720 may control access to the resource 710 based on the second label 714. Accordingly, the access controller 720 may control access to resources associated with labels after the labels have been relabeled.

As illustrated in FIG. 7, The access rule 130 may be specified in the textual policy as follows:

allow client_t serial_dev_t:channel {connect}

The format of the access rule 130 in the above example is control access by <permission indicator>_<label of the subject of the controlled access><label of resource>:<resource type>{<operation indicator>} The transition rule 716 may be specified in any other suitable format. For example, the access controller 720 may detect that the second process 114b associated with the label "client_t" is attempting connect to the channel associated with the second label 714 "serial0_channel_t." The access controller 720 may permit the second process 114b to connect to the channel 710 in accordance with the access rule 130.

Alternatively or in addition, the transition controller 706 may relabel any type of resource in response to any type of event specified in the transition rule 716. In addition, the access controller 720 may control any type of operation to any type of resource based on the second label specified in the transition rule 716. The resource 710 may include any physical or virtual component identified in one or more computing systems. In some examples, the resource 710 may include a communication component. For example, the resource 710 may include one or more of the channels 108, a socket, a named pipe, or any other communication component. Alternatively or in addition, the resource 710 may include processing components such as processes or threads. In further examples, the resource 710 may include a memory location, a range of memory locations, a file, a path, and any other information stored on a computing system. Furthermore, the resource 710 may include components external to the system 700. For example, the resource 710 may include the node 122, the node 124, a network address, or other networking component. Alternatively or in addition, the resource 710 may include the kernel 120, the operating system 704, or any other component described herein.

The event 708 may include any activity that occurs in one or more computing systems. The event 708 may include an attempt to perform the activity or the actual performance of the activity. For example, the event 708 may include an operation, for example an invocation of the programmatic procedure "attach( )" illustrated in FIG. 7. In other examples, the event 708 may include communication between resources. For example, the event 708 may include communication between the kernel 120 and one or more of the processes 114. In other examples, the event 708 may include communication between the processes 114, or between any of the processes 114 and any other resource.

The event 708 may be associated with the resource 710. The event 708 associated may include performing an activity based on the resource 710 or information related to the resource 710. For example, the information related to the resource 710 may include identifiers of the resource 710, such as one of the resource identifiers 730. Thus, for example, the event 708 associated with the resource 710 may include attaching the resource identified as "CID_445566" with the path identified as "/dev/serial0". In other examples, the event 708 may be associated with the resource 710 when the event 708 involves connecting to, disconnecting from, communicating with, or otherwise associating with the resource 710 during the event 708.

In some examples, the transition controller 706 may relabel the resource 710 in response to the event 708 being caused by one or more of the processes 114. For example, the event 708 may be caused by the first process 114a when the first process 114a performs operations, invocation of programmatic procedures, messaging, or other activity that lead to an occurrence of the event 708. The transition rule 716 may indicate relabeling the first label 712 in response to the first process 114a causing the event 708. Accordingly, the transition controller 706 may relabel the first label 712 when the first process 114a causes the event 708, in accordance with the transition rule 716.

Alternatively or in addition, the transition controller 706 may relabel the resource 710 in response to the event 708 being caused by one or more nodes 122, 124. For example, the event 708 may be caused by the first node 122 when the node 122 performs operations, invocation of programmatic procedures, messaging, or other activity that lead to an occurrence of the event 708. The transition rule 716 may indicate relabeling the first label 712 in response to the first 122 causing the event 708. Accordingly, the transition controller 706 may relabel the first label 712 when the first node 122 causes the event 708, in accordance with the transition rule 716. In other examples, the transition controller may relabel the resource in response to the event being caused by any subject, including the processes 114, the nodes 122, 124, or any other identifiable source.

In some examples, the transition controller 706 may relabel the resource 710 in accordance with the transition rule 716 independent from the process, node, or other source that caused the event 708. As illustrated in FIG. 7, the first process 114a may cause the event 708. The transition controller 706 may detect the event and relabel the resource 710 outside of the process 114a. For example, the transition controller 706 may relabel the resource 710 in a separate process. Alternatively or in addition, the transition controller 706 may relabel the resource 710 in the kernel 120. For example, the transition controller 706 may relabel the resource 710 in a separate operating space from the user space 210 of the first process 114a where the event 708 was caused. In some examples, the transition controller 706 may relabel the resource 710 in the kernel space 208 of the process 114a or any other process.

The security policy 718 may include the information used by the system 700 to perform the label-based mandatory access control. In addition, the security policy 718 may include the information used to transition labels applicable in the label-based mandatory access control. The security policy may include the labels 724, the transition rules 726, the access rules 728, the channel policy 132, or any other information used to perform mandatory access control. The security policy 718 may include text that specifies the label-based mandatory access control. Alternatively, the security policy 718 may include a binary policy comprising machine-readable information. In other examples, the security policy 718 may include information arranged in any manner and in any format that the system 700 may use apply the label-based mandatory access control, as described herein.

The access rules 728 may include one or more of the access rule 130. As described herein, the access rule 130 may govern access to channels. More generally, the access rules 728 may govern access to one or more resources. Alternatively or in addition, the access rules 728 may indicate how to control the types of activities or operations performed to, with, or on the resources. For example, the access rule 130 may govern connecting, communicating, or otherwise associating with resources. For example, the access rule 130 may include a permission indicator that specifies whether the grant the operation, deny the operation, or perform any other action to control access in response to the operation. In addition, the access rule 130 may include an operation indicator. The operation indicator may specify the type of access being controlled. For example, the control indicator may specify connect, open, rename, move, or any other type of operation performed on or associated with the resource 710. Further, the access rule 130 may include additional information used to govern access to resources including, for example the second label 714, or any other labels. The access controller 720 may control access to the resources based on the permission indicator, the operation indicator, the labels 724, and any of the addition in formation included in the access rule 130.

The operating system 704 may include any system that supports the basic functions of one or more computing systems. For example, the operating system 704 may schedule tasks, execute applications, manage threads, manage memory, or carry out any other basic computing function. The operating system 704 may include the kernel 120. Alternatively the operating system may include the micro-kernel 202. Further, the operating system 704 may include the message-based operating system 104.

The kernel 120 may include a privileged space that implements all or a portion of the operating system features. In some examples, each of the nodes 122, 124 may include a separate kernel. The kernel 120 may include the micro-kernel 202. The micro-kernel 202 may include a reduced set of operating system features necessary to implement the operating system 702. A micro-kernel based operating system may implement some operating system features in the micro-kernel and other operating system features in separate processes. In other examples, the kernel 120 may include a monolithic kernel wherein all operating system features are implemented in the monolithic kernel. Alternatively or in addition, the kernel 120 may include any other example of kernels known in the art.

The transition rules 726 may include any grouping of information that indicates when to relabel resources. Each of the transition rules may include one or more labels, a resource identifier, or any other type of identifier described herein. Each of the transition rules may provide for relabeling the resource 710 in response to particular activity. For example, the transition rules may provide for relabeling the resource 710 in response to the event 708. The transition controller may relabel the resource 710 in accordance with the transition rules.

The policy enforcement point 721 may impose limits on when the resource 710 may be relabeled. In some examples, the policy enforcement point 721 may limit the number of times the resource 710 may be relabeled. In other examples, the policy enforcement point 721 may restrict relabeling the resource 710 based on the first label 712 assigned to the resource 710. For example, the transition rule 716 may provide that if the event 708 occurs to the resource 710 labeled with the first label 712, the resource 710 should be relabeled to the second label 714. However, if, when the event 708 occurs, and the transition controller 706 determines that the resource 710 is not labeled with the first label 712, then the transition controller 706 may be prohibited from relabeling the resource 710 with the second label 714.

Alternatively or in addition, the policy enforcement point 721 may restrict relabeling the resource 710 after the first label 712 is assigned to the resource 710. For example, the first label 712 may be assigned to the resource 710 by the process that created the resource or according a default label indicated in the security policy 718. The transition controller 706 may restrict relabeling of the resource based on the default label or the label provided by the process that created the label. In another example, the transition controller 706 may restrict a third label from being assigned to the resource after the resource is relabeled with the second label 714.

Relabeling may also be restricted based on the access rules 728. For example, the access rule 130 may prevent the resource 710 from being relabeled if a particular process causes the event. For example, if the access rule 130 indicates that the resource 710 should not be relabeled if the first process 114a causes the event 708, the transition controller may be restricted from relabeling the resource 710, even if the transition rules 726 provide for relabeling the resource 710 based on the event 708.

The policy enforcement point 721 may generate an error in response to a restriction on relabeling. The error may be provided to the process that caused the event. For example, if the first process 114a causes the event 708 by a procedural call, the transition controller 706 may generate an error in response to the restriction on relabeling. In one particular example, the transition rules 726 may provide that when the resource 710 attaches to the path "/public", the resource 710 should have the label "public" while if the resource 710 attaches to the path "/secret", the resource 710 should have the label "secret". A conflict may occur if the resource 710 is attached to both paths because the resource 710 may only be allowed to have one label.

Alternatively or in addition, the policy enforcement point 721 may prohibit an indeterminate label policy included in the transition rules 726. An indeterminate label policy includes transition rules where the label assigned to the resource 710 cannot be determined after the event 708 occurs. For example, the indeterminate label policy may include a first transition rule that provides for relabeling the resource 710 with the second label 714 and second transition rule that provides for relabeling the resource 710 with a third label. The policy enforcement point 721 may prohibit the indeterminate label policy by, for example, generating an error when the security policy is loaded by the system 700. In other examples, a compiler configured to compile the textual policy into the security policy 718 may generate an error in response to the indeterminate label policy.

Figure 8:
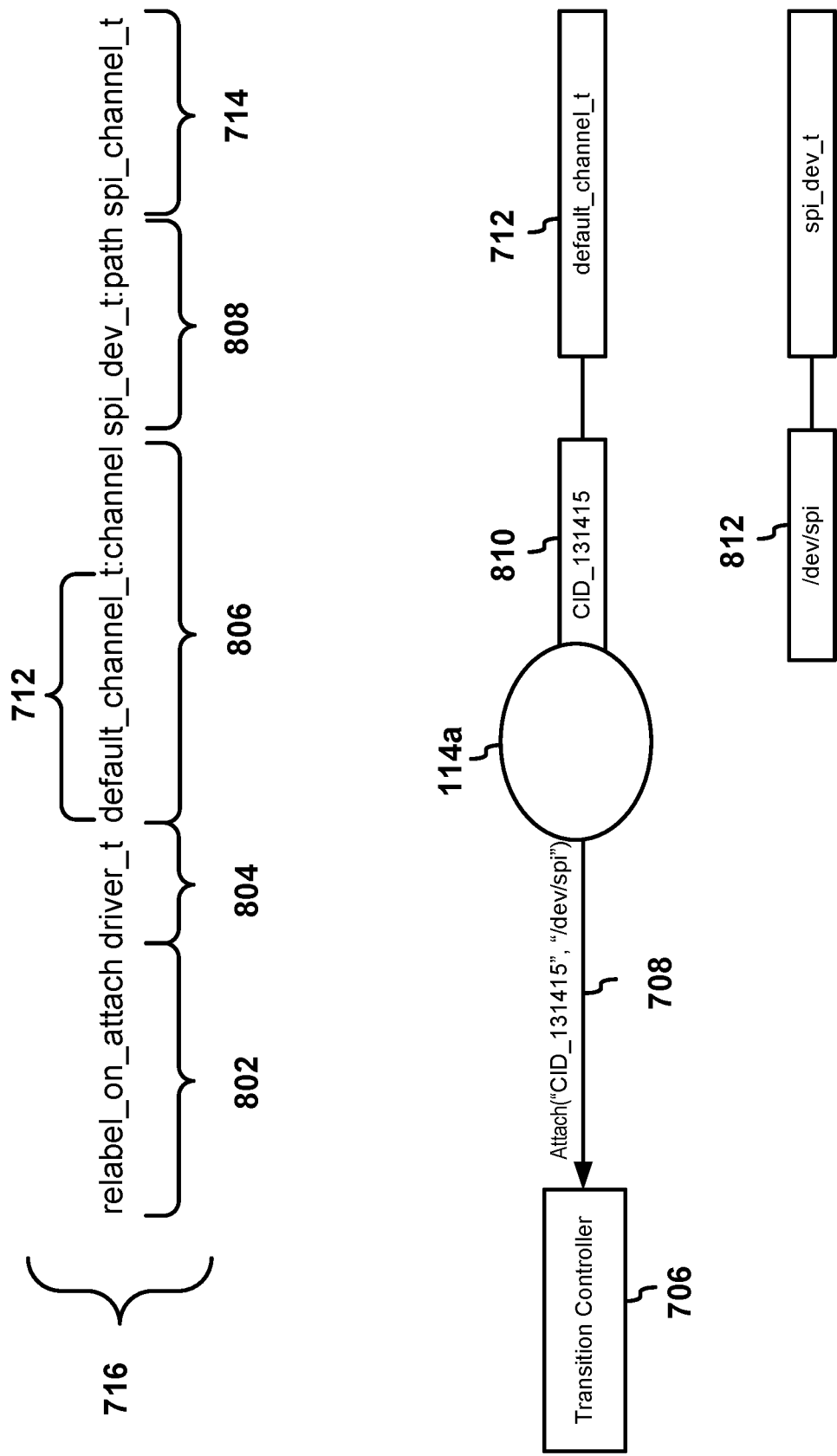
FIG. 8 illustrates an example of a textual definition of a transition rule.

FIG. 8 illustrates an example of a textual specification of the transition rule 716. The transition rule 716 may include information including an event type identifier 802, a process label 804, a primary resource indicator 806; and a secondary resource indicator 808.

The event type identifier 802 may include an identification of any type of the event 708 described herein. The transition controller 706 may relabel the resource 710 in response to the event 708 having a type indicated by the event type identifier 802 of the transition rule 716. The event type identifier 802 may include an identification of a type of the event 708. For example, the event type identifier 802 may be included in a group of predefined identifiers. Each of the predefined identifiers may identify a corresponding type of event. The transition controller 706 may apply the transition rule in response to the transition rule including the event type identifier 802.

The process label 804 may include an identification of the first process 114a causing the event 708. The process label 804 may include one of the labels 724. Alternatively, the process label 804 may include a PID or any form process identification.

The primary resource indicator 806 may identify a first resource 810 to be relabeled. The primary resource indicator 806 may include the first label 712 of the first resource 810. In addition, the primary resource indicator 806 may include an indication of the type of the first resource 810. The transition controller 706 may relabel the first resource 810 to second label 714 in response to the first resource 810 having the first label 712. In addition, the transition controller 706 may relabel the first resource 810 to second label 714 in response to the first resource 810 being the type of resource provided in the resource indicator 806. For example, as illustrated in FIG. 8, the transition controller 706 may relabel the first resource 810 in response to the first resource 810 having the label "default_channel_t" and being a channel. In other examples, the type of resource may include any other type of resource, such as a socket, file, or any other form of the resource 710 described herein.

The secondary resource indicator 808 may identify a second resource 812. The secondary resource indicator 808 may indicate that the second resource 812 is being associated with the first resource 810 through the event 708. The secondary resource indicator 808 may include the label corresponding to the second resource 812. In addition, the secondary resource indicator 808 may include the type of resource of the second resource 812. The transition controller 706 may relabel the first resource 810 to the second label 714 in response to the secondary resource indicator 808 including the label of the second resource 812. In addition, the transition controller 706 may relabel the first resource 810 to the second label 714 in response to the second resource 812 being the type of resource indicated by the secondary resource indicator 808. For example, as illustrated in FIG. 8, the transition controller 706 may relabel the first resource 810 in response to the second resource 812 having the label "spi_dev_t" and being a path. More generally, the transition rule may indicate that the first resource 810 is to be relabeled to the second label 714 in response to the first resource 810 being associated with the second resource 812. In accordance with the transition rule, the transition controller 706 may relabel the first resource 810 with the second label 714 in response to the event associating the first resource 810 with the second resource 814.

The transition rule 716 may include all, or a portion of, the event type identifier 802, the process label 804, the primary resource indicator 806; and the secondary resource indicator 808. In some examples, the transition rule 716 may exclude the process label 804. Accordingly, the transition controller 706 may relabel the first resource 810 with the second label 714 without concern for which process caused the event 708. Alternatively or in addition, the transition rule 716 may exclude the secondary resource indicator 808. Thus, the transition controller 706 may relabel the first resource 810 with the second label 714 without concern for any other resources, such as the second resource 812.

The transition controller 708 may relabel the first resource 810 in response to an association between the first resource 810 and the second resource 812. For example, the first resource 810 may attach to the second resource 812. The first resource 810 is said to attach to the second resource when the event 708 causes an association between the first resource 810 and the second resource 812. The association may include a mapping between an identifier of the first resource 810 and an identifier the second resource 812. For example, the association may include mapping the label of the first resource 810 and the label of the second resource 812. In other examples, the association may include a mapping between an identifier of the first resource and an identifier of a group of resources. In one example, the association may include a mapping between the path 732 and the node identifier 404, the process identifier 406, the channel identifier 408, and any combination therein. Processes may access the path 732 to discover the node identifier 404, the process identifier 406, the channel identifier 408, or any other identifier, label, or information attached to the path 732.

In some examples, the second resource 812 may include the path 732. The path 732 may include the file path, as described herein. More generally, the path 732 may include a virtual location of any resource on a computing system. For example, the path may include the file path, a directory, a portion of a data structure, for example a tree, a network address, an internet address, for example a URI or a URL, a memory address, or any other address of information. The transition rule 716 may indicate to the transition controller to relabel the first resource 810, for example the channel 108a, with the second label 714 in response to the channel 108a attaching to the path 732. The transition controller may relabel the first resource 810 in accordance with the transition rule.

In other examples, the transition controller 706 may relabel the first resource 810 with the second label 714 in response other types of the events. For example, the first resource 810 may include a TCP/IP socket, the second resource 812 may include a TCP/IP port and the event 708 may include a bind operation that binds the socket with the port or a path. The socket may include, for example, an internal endpoint for sending or receiving data. The transition rule 716 may provide for relabeling the socket with the second label in response to bind operation with the port or the path. In other examples, the transition rule 716 may provide for relabeling the first resource 812 in response to any network operation. In addition, the transition rule 716 may provide for relabeling the first resource in response to the first resource being associated with networking identifiers, such as IP addresses, ports, uniform resource locators, or any other identifier of networking objects.

The transition rule 716 may provide for relabeling the first resource 810 in response to a file operation. For example, the first resource 810 may include a file. The file may include data structures used to track information in the system 700. The file operation may include, for example, moving the file between paths, renaming the file, or any other type of operation associated with the file. Thus, the transition rule 716 may assign the second label 714 to the file in response to the file being moved to the path 732. The transition controller may relabel the file, or any other example of the first resource 810, in accordance with the transition rule 716.

Figure 9:
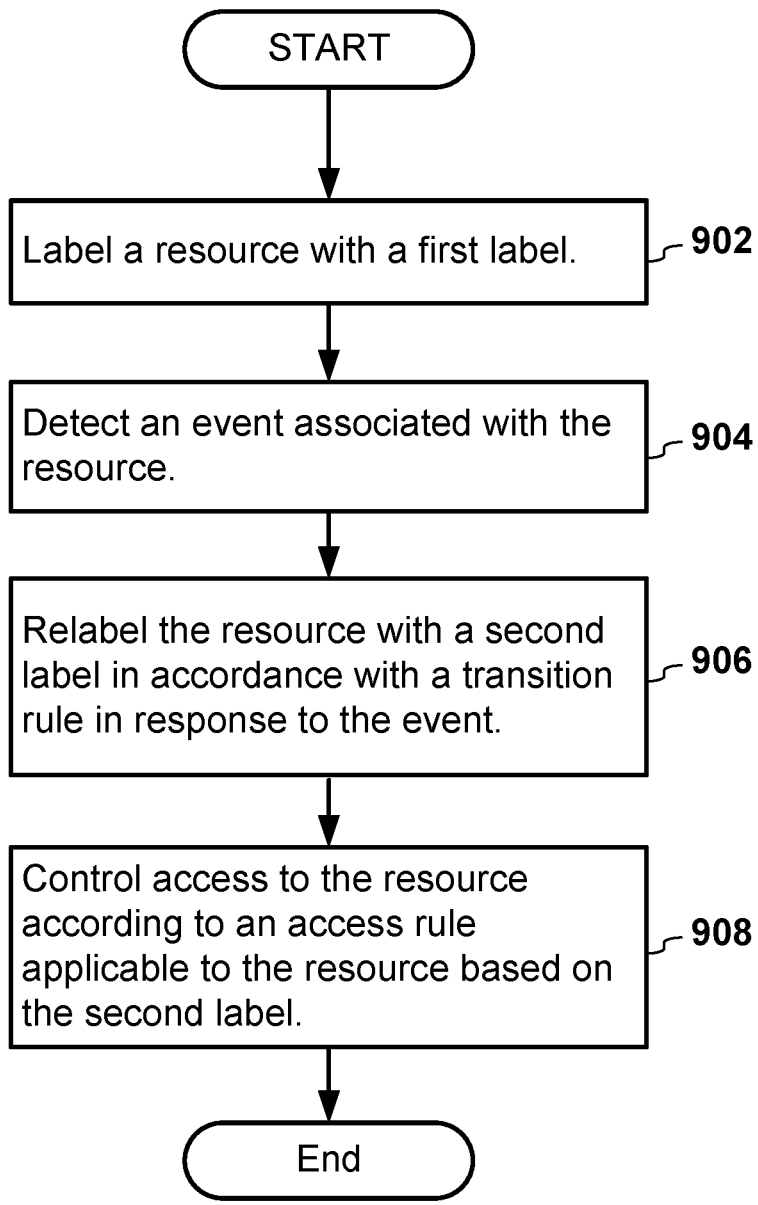
FIG. 9 illustrates a flow diagram of example logic of a system to enforce label-based mandatory access control.

FIG. 9 illustrates a flow diagram of example logic of the system 700 to enforce label-based mandatory access control. When the system 700 starts, the system 700 may label the resource 710 with the first label 712 (902). In some examples a process may assign the first label 712 to the resource 710. For example, the first process 114a may create a channel 108a. The first process may assign the first label 712 to the channel 108a.

The transition controller 706 may assign a default label to the resource 710. The default label may be included in the security policy 718. For example, the first label 712 may be the default label in the security policy 718. The system 700 may assign the default label to the resource 710 when the resource 710 is created. In some examples, the default label may be associated with a resource type identifier in the security policy 718. The resource type identifier may indicate the type of the resource 710. The system 700 may assign the default label to resources that are created according to the resource type identifier. Thus, for example, the system 700 may assign a first default label to a first type of resources and a second default label to a second type of resources.

The transition controller 706 may detect the event 708 associated with the resource 710 (904). For example, the kernel 120 may detect the event 708 associated with the resource 710. Alternatively n addition, the event may be detected by a separate process from the process that caused the event 708. The event 708 may include any of the events described herein. In some examples, the system 700 may detect the event 708 caused by the first process 114a. For example, the first process 114a may cause the event. The system 700 may determine, for example, that the first process 114a caused the channel 108a to be attached to a path. In another example, the system 700 may determine that the first process 114a caused a socket to bind to a port. In a further example, the system 700 may determine that the first process 114a caused a file to be transferred from a source path to a destination path. In other examples, the system 700 may determine any event which includes activity or operations related to the resource 710.

The transition controller 706 may relabel the resource 710 with the second label 714 in accordance with the transition rule 716 in response to detection of the event 708 (906). The transition rule 716 may be included in the security policy 718. The transition rule 716 may indicate that the resource 710 may be assigned the second label 714 in response to the event 708 being detected. In some examples, the transition rule 716 may further indicate that the resource 710 may be assigned the second label 714 in response to the event 708 being caused by the first process 114a.

The access controller 720 may control access to the resource 710 according to the access rule 130 (908). The access rule 130 may be applicable to the resource 710 based on the access rule 130 identifying the second label 714 assigned to the resource 710. For example, the access rule 130 may allow the second process 114b to perform operations associated with the resource 710. The operations may be identified in the access rule 130. In addition, the access rule 130 may include the second label 714 that was transitioned form the first label 712 by the transition controller 706.

The logic illustrated in FIG. 9 may be implemented in a different sequence. The logic illustrated in FIG. 9 may include additional, different, or fewer operations. For example, the logic illustrated in FIG. 9 may also include an operation to restrict relabeling. For example, the operation may restrict relabeling in response to the indeterminate label policy. In other examples, the operation may limit the number of times that the resources may be relabeled. In addition, the operation may generate an error and provide the error to the process that caused the event 708. Alternatively or in addition, the operation may generate an error when the security policy 718, or any portion thereof, is loaded by the system 700.

Figure 10:
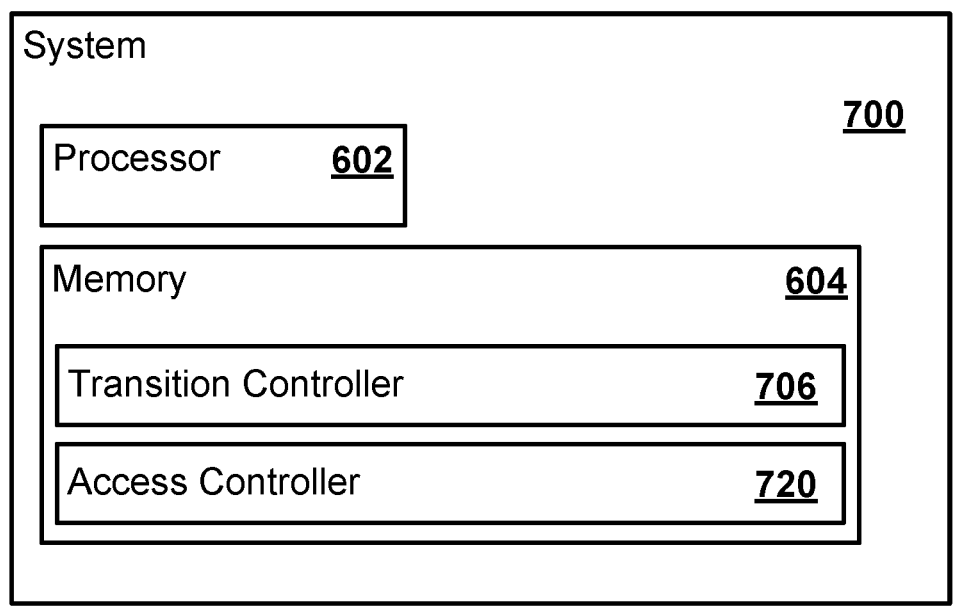
FIG. 10 illustrates a second example of a system that includes a memory and a processor.

The system 700 may be implemented with additional, different, or fewer components than illustrated. For example, FIG. 10 illustrates an example of the system 700 that includes the memory 604 and the processor 602.

The processor 602 may further include one or more devices operable to execute logic of the system 700. The logic of the system 700 may include computer executable instructions or computer code embodied in the memory 604 or in other memory that when executed by the processor 602, cause the processor 602 to perform the features implemented by the logic of the system 700. The computer code may include instructions executable with the processor 602.

The memory 604 may include at least one of the transition controller 706, the access controller 720, or any other component in the system 700. The channel manager module 606 may include any module configured with the logic of the system 700 to enforce mandatory access control.

Each component may include additional, different, or fewer components. For example, the kernel 120 may include the transition controller 706 and the access controller 720. Alternatively, the transition controller 706 or the access controller 720 or both may be implemented outside of the kernel 120. In some examples, the system 700 may include multiple transition controllers. Each of the transition controllers may manage the labels associated with one or more types of resources. For examples, a first transition controller may control labels associated with sockets while a second transition controller may control labels associated with channels. Alternatively or in addition, the system 700 may include multiple access controllers. Each of the access controllers may control access to one or more types of resources.

The system 700 may be implemented in many different ways. Each module such as the transition controller 706 and the access controller 720, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 604, for example, that comprises instructions executable with the processor 602 or other processor to implement one or more of the features of the module. When any one of the module includes the portion of the memory that comprises instructions executable with the processor, the module may or may not include the processor. In some examples, each module may just be the portion of the memory 604 or other physical memory that comprises instructions executable with the processor 602 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 700 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may be implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system to enforce label-based mandatory access control in an operating system, the system comprising a processor to:
   relabel, in response to detection of an event associated with a resource, the resource from a first label to a second label in accordance with a transition rule, the transition rule included in a security policy, the transition rule indicating that the resource is to be relabeled to the second label if the event is detected; and
   control access to the resource according to an access rule in the security policy, the access rule applicable to the resource based on the access rule identifying the second label with which the resource is relabeled.
2. The system of aspect 1, wherein the resource is relabeled with the second label in response to the event caused by a process labeled in the transition rule.
3. The system of any of aspects 1 to 2, wherein the resource comprises a channel and the event comprises attachment of the channel to a path.
4. The system of any of aspects 1 to 3, wherein the resource comprises a socket and the event comprises a binding of the socket to at least one of a path or a port.
5. The system of any of aspects 1 to 4, wherein the resource comprises a file and the event comprises a movement of the file from a first path to a second path.
6. The system of any of aspects 1 to 5, wherein the processor is further configured to label the resource with a first label in response to creation of the resource by a process labeled with the first label.
7. The system of any of aspects 1 to 6, wherein the processor is further configured to restrict a third label from being assigned to the resource after the resource is relabeled with the second label.
8. A method to enforce label-based mandatory access control in an operating system, the method comprising:
   labeling a resource with a first label;
   relabeling the resource with a second label in accordance with a transition rule in response to detection of an event associated with the resource, the transition rule included in a security policy, the transition rule indicating that the resource is to be relabeled to the second label if the event is detected; and
   controlling access to the resource according to an access rule in the security policy, the access rule applicable to the resource based on the access rule identifying the second label assigned to the resource.
9. The method of aspect 8, wherein the relabeling of the resource is performed by a kernel of the operating system.
10. The method of any of aspects 8 to 9, wherein the kernel comprises a micro-kernel.
11. The method of any of aspects 8 to 10, wherein the operating system comprises a message-based operating system.
12. The method of any of aspects 8 to 11, wherein the relabeling of the resource is performed by a first process independently of a second process, wherein the second process caused the event.
13. The method of any of aspects 8 to 12, wherein the first label comprises a default label in the security policy, wherein the default label is assigned to the resource in response to creation of the resource.
14. The method of any of aspects 8 to 13, wherein the transition rule further comprises an event type identifier indicative of the event, wherein detection of the event is based on the event type identifier.
15. A computer readable medium comprising instructions executable by a processor to implement mandatory access control, the instructions comprising:
   instructions executable to label a resource with a first label;
   instructions executable to relabel the resource with a second label in accordance with a transition rule in response to detection of an event associated with the resource, the transition rule included in a security policy, the transition rule indicating that the resource is to be assigned the second label in response to the event being detected; and
   instructions executable to control access to the resource according to an access rule in the security policy, the access rule applicable to the resource based on the access rule identifying the second label assigned to the resource.
16. The computer readable medium of aspect 15, wherein the resource comprises at least one of a channel, a socket, or a file.
17. The computer readable medium of any of aspects 15 to 16, further comprising instructions executable by the processor to generate an error in response to the security policy having an indeterminate label policy, the indeterminate label policy indicating that the resource is to be assigned the second label in response to detection of a first event and that the resource is to be assigned a third label in response to detection of a second event.
18. The computer readable medium of any of aspects 15 to 17, wherein the resource comprises a first resource, wherein the transition rule further indicates that the resource is to be relabeled to the second label in response to an operation that associates the first resource with a second resource, wherein the first resource is relabeled with the second label in response to the event associating the first resource with the second resource.
19. The computer readable medium of any of aspects 15 to 18, wherein the transition rule comprises an event identifier and a process identifier, wherein the resource is relabeled in response to a process corresponding to the process identifier causing the event corresponding to the event identifier.
20. The computer readable medium of any of aspects 15 to 19, wherein the event comprises attachment of the resource to a second resource labeled with a label that is specified in the transition rule.

What is claimed is:

1. A system to enforce label-based mandatory access control in a message-based operating system, the system comprising:
   a processor; and
   a memory having instructions executable by the processor to:

label a resource with a first label in response to creation of the resource by a process labeled with the first label;

relabel, in response to detection of an event associated with the resource, the resource from the first label to a second label in accordance with a transition rule, the transition rule included in a security policy, the transition rule indicating that the resource is to be relabeled to the second label if the event is detected, wherein the resource comprises a first resource, wherein the transition rule further indicates that the resource is to be relabeled to the second label in response to an operation that associates the first resource with a second resource, wherein the first resource is relabeled with the second label in response to the event associating the first resource with the second resource, wherein the resource is relabeled with the second label in response to the event caused by a second process labeled in the transition rule; and control access to the resource according to an access rule in the security policy, the access rule applicable to the resource based on the access rule identifying the second label with which the resource is relabeled.

2. The system of claim 1, wherein the resource comprises a channel and the event comprises attachment of the channel to a path.

3. The system of claim 1, wherein the resource comprises a socket and the event comprises a binding of the socket to at least one of a path or a port.

4. The system of claim 1, wherein the resource comprises a file and the event comprises a movement of the file from a first path to a second path.

5. The system of claim 1, wherein the processor is further configured to restrict a third label from being assigned to the resource after the resource is relabeled with the second label.

6. A method to enforce label-based mandatory access control in a message-based operating system, the method comprising:

labeling a resource with a first label in response to creation of the resource by a process labeled with the first label;

relabeling the resource with a second label in accordance with a transition rule in response to detection of an event associated with the resource, the transition rule included in a security policy, the transition rule indicating that the resource is to be relabeled to the second label if the event is detected, wherein the resource comprises a first resource, wherein the transition rule further indicates that the resource is to be relabeled to the second label in response to an operation that associates the first resource with a second resource, wherein the first resource is relabeled with the second label in response to the event associating the first resource with the second resource, wherein the resource is relabeled with the second label in response to the event caused by a second process labeled in the transition rule; and controlling access to the resource according to an access rule in the security policy, the access rule applicable to the resource based on the access rule identifying the second label assigned to the resource.

7. The method of claim 6, wherein the relabeling of the resource is performed by a kernel of the operating system.

8. The method of claim 7, wherein the kernel comprises a micro-kernel.

9. The method of claim 6, wherein the relabeling of the resource is performed by a first process independently of the second process.

10. The method of claim 6, wherein the first label comprises a default label in the security policy, wherein the default label is assigned to the resource in response to creation of the resource.

11. The method of claim 6, wherein the transition rule further comprises an event type identifier indicative of the event, wherein detection of the event is based on the event type identifier.

12. A non-transitory computer readable medium comprising instructions executable by a processor to implement label-based mandatory access control in a message-based operating system, the instructions comprising:

instructions executable to label a resource with a first label in response to creation of the resource by a process labeled with the first label;

instructions executable to relabel the resource with a second label in accordance with a transition rule in response to detection of an event associated with the resource, the transition rule included in a security policy, the transition rule indicating that the resource is to be relabeled to the second label in response to the event being detected, wherein the resource comprises a first resource, wherein the transition rule further indicates that the resource is to be relabeled to the second label in response to an operation that associates the first resource with a second resource, wherein the first resource is relabeled with the second label in response to the event associating the first resource with the second resource, wherein the resource is relabeled with the second label in response to the event caused by a second process labeled in the transition rule; and instructions executable to control access to the resource according to an access rule in the security policy, the access rule applicable to the resource based on the access rule identifying the second label assigned to the resource.

13. The non-transitory computer readable medium of claim 12, wherein the resource comprises at least one of a channel, a socket, or a file.

14. The non-transitory computer readable medium of claim 12, further comprising instructions executable by the processor to generate an error in response to the security policy having an indeterminate label policy, the indeterminate label policy indicating that the resource is to be assigned the second label in response to detection of a first event and that the resource is to be assigned a third label in response to detection of a second event.

15. The non-transitory computer readable medium of claim 12, wherein the transition rule comprises an event identifier and a process identifier, wherein the resource is relabeled in response to a process corresponding to the process identifier causing the event corresponding to the event identifier.

16. The non-transitory computer readable medium of claim 12, wherein the event comprises attachment of the resource to a second resource labeled with a label that is specified in the transition rule.

* * * * *